United States Patent Office 2,922,792
Patented Jan. 26, 1960

2,922,792

CERTAIN ESTER DERIVATIVES OF 2-MERCAPTO-PYRIDINE, N-OXIDE

Jack Rockett, Metuchen, N.J., assignor to Olin Mathieson Chemical Corporation, New Haven, Conn., a corporation of Virginia No Drawing. Application January 6, 1958
Serial No. 707,132

7 Claims. (Cl. 260—294.8)

This invention relates to a new group of chemical compounds and to processes for their preparation. More particularly, this invention relates to ester derivatives of 2-mercaptopyridine-1-oxide which display biological activity.

The compounds of the present invention are represented by the following general formula:

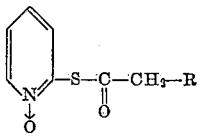

wherein R is an aryl group or an aryloxy group. Representative examples of suitable groups are phenyl, naphthyl, phenoxy, naphthoxy and halogenated derivatives thereof such as chlorophenoxy and the like.

It has been found that compounds of the general formula display biological activity and, more particularly, that the compounds of the present invention possess pesticidal properties. They have been found to be active as agricultural fungicides for application to soil or plant foliage. They can be employed in any of the forms conventionally employed for the application of pesticides. Thus, they can be used as solid compositions, wherein they are admixed with suitable inert, solid diluents such as talc. They can also be employed as solutions or emulsions in suitable media.

These compounds are prepared by the reaction of an aryl or aryloxy acetyl-halide with 2-mercaptopyridine-1-oxide, preferably in the presence of a base such as pyridine. The aryl or aryloxy acetyl halides are readily prepared by reacting arylacetic acid or aryloxyacetic acid with thionyl chloride, for example.

While the use of pyridine has been stated to be preferable, it is obvious that other acid binding agents can be employed. Thus, inorganic bases, such as sodium carbonate, or organic bases, such as quinoline or dimethyl aniline can be likewise used. Similarly, other inert solvents, such as toluene, can be employed in place of the benzene which is used as the solvent medium in the specific examples.

The compound herein referred to as 2-mercaptopyridine-1-oxide, although generally represented as:

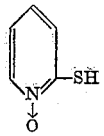

is believed to be a mixture of two tautomeric isomers, as follows:

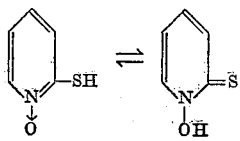

It is understood that the compound may react in either of these forms, depending upon the specific reactants with which it is brought in contact. It is believed to be the nature of the reaction cited herein that the pyridine-thione reacts in the "mercapto" form, as follows:

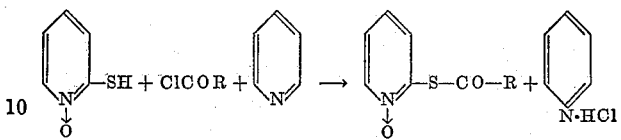

However, the invention is not exclusive of the possibility that 2-mercaptopyridine-1-oxide reacts in the "thione" form, the product of this reaction being an anhydride of a thiohydroxamic acid and a carboxylic acid, as follows:

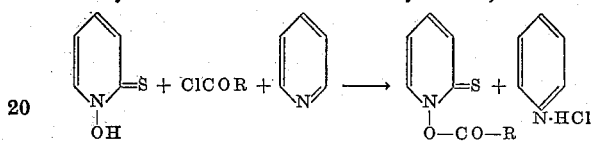

While the use of a particular reaction sequence has been illustrated, other methods of preparation are possible. The preparation of the compounds of this invention are illustrated in the following examples which are for purposes of illustration only and are not to be construed as limiting the scope of the invention.

*Example I*

In a flask was placed 42.7 g. (0.193 mole) of 2,4-dichlorophenoxyacetic acid. To it was added, gradually, 61.4 g. (0.519 mole) of thionyl chloride. The resulting slurry was heated to 90° for two hours. The excess thionyl chloride was distilled at 130 mm. pressure and the residual oil was taken up in ether and transferred to a small distilling flask. Distillation gave 41.4 g. of the product, 2,4-dichlorophenoxyacetyl chloride, a colorless oil, B.P. 147°/11 mm.; an 89.8% yield.

In a flask was placed 20.7 g. (0.163 mole) of 2-mercaptopyridine-1-oxide, 12.9 g. (0.163 mole) of pyridine, and 100 cc. of benzene. The mixture was cooled with an ice bath as 39.0 g. (0.163 mole) of 2,4-dichlorophenoxy-acetyl chloride was added dropwise. When the addition was completed, the flask was heated to 55° for three hours. The reaction mixture was filtered and the filtrate was washed with cold water. The benzene was distilled at reduced pressure, leaving a brown viscous oil which crystallized, 43.8 g. The product was recrystallized from acetone plus water giving fine needles, M.P. 90–91°, S-(2-pyridyl-1-oxide)-2',4'-dichlorophenoxythioacetate.

*Analysis.*—Calc'd. for $C_{13}H_9Cl_2NO_3S$: S, 9.70%; Cl, 21.53%; N, 4.24%. Found: S, 10.02%; Cl, 21.63%; N, 4.70%.

*Example II*

In a flask was placed 186.5 g. (1.0 mole) of p-chlorophenoxyacetic acid. To it was added, slowly, 297.5 g. (2.5 moles) of thionyl chloride. When the addition was completed, the slurry was heated on the steam bath until there was no further gas evolution. The excess thionyl chloride was distilled at 31°/148 mm. and the residual oil was distilled at 145–148°/24 mm. There was obtained 191.6 g. of the product, a colorless oil, p-chlorophenoxy-acetyl chloride.

In a flask was placed a solution of 38.1 g. (0.3 mole) of 2-mercaptopyridine-1-oxide, 23.7 g. (0.3 mole) of pyridine, and 300 cc. of benzene. To it was added, dropwise, 61.5 g. (0.3 mole) of p-chlorophenoxyacetyl chloride. The temperature was kept between 30 and 40° by intermittent cooling with an ice bath. A thick yellow precipitate formed. Another 200 cc. of benzene was added and the slurry was heated to 40–50° for another hour.

The precipitate was washed with benzene and then suspended in 200 cc. of water. It was filtered and the precipitate was dried in a vacuum desiccator. There was obtained 70.3 g. of the final product, M.P. 124–125°; representing a 79.5% yield of S-(2-pyridyl-1-oxide)-p-chlorophenoxythioacetate.

Analysis.—Calc'd. for $C_{13}H_{10}O_3ClNS$: S, 10.84%; Cl, 11.99%. Found: S, 10.64%; Cl, 11.88%.

*Example III*

In a flask was placed 66.5 g. (0.36 mole) of α-naphthaleneacetic acid. While stirring slowly, 85.0 g. (0.72 mole) of thionyl chloride was added gradually. The slurry was heated on the steam bath for two hours at 80–90°. The excess thionyl chloride was distilled at 34°/173 mm. and the residual oil was distilled at 183°/23 mm. giving 18.2 g. of the product, α-naphthaleneacetyl chloride, a colorless oil.

To a solution of 23.0 g. (0.181 mole) of 2-mercaptopyridine-1-oxide, and 14.3 g. (0.181 mole) of pyridine in 100 cc. of benzene was added a solution of 36.7 g. (0.179 mole) of α-naphthaleneacetyl chloride in 50 cc. of benzene, dropwise. The temperature was kept between 30 and 40° by intermittent cooling. When the addition was completed, the flask contents were heated to 55° and cooled. The flask contents were placed in a separatory funnel and washed with water. The benzene solution was then distilled at reduced pressure until the solvent had been completely removed. There remained 51.2 g. of the final product, a dark red viscous oil. This represented a 96.9% yield of S-(2-pyridyl-1-oxide)-α-naphthalenethioacetate.

Analysis.—Calc'd. for $C_{17}H_{13}NO_2S$: N, 4.74%; S, 10.87%. Found: N, 4.79%; S, 10.84%.

*Example IV*

To the solid, powdered, 2,4,5-trichlorophenoxyacetic acid 76.4 g. (0.3 mole) there was added, dropwise, 71.4 g. (0.6 mole) of thionyl chloride. When the addition was completed, the slurry was heated to 80° for three hours. The excess thionyl chloride was distilled and the crude oil remaining of 2,4,5-trichlorophenoxyacetyl chloride was used for the following synthesis.

To a solution of 38.1 g. (0.3 mole) of 2-mercaptopyridine-1-oxide and 23.7 g. (0.3 mole) of pyridine in 200 cc. of benzene was added, dropwise, a solution of 78.6 g. (0.3 mole) of 2,4,5-trichlorophenoxyacetyl chloride in 100 cc. of benzene. A cooling bath was applied to keep the temperature between 25 and 38°. When the addition was completed, the flask was heated to 50° for two hours. The precipitate was filtered. It was washed with benzene and then suspended in 500 cc. of water. The precipitate was again filtered and dried. The product, a pale gray-green solid weighs 84.0 g., M.P. 121–126°. This represented a 77.2% yield of S-(2-pyridyl-1-oxide)-2,4,5-trichlorophenoxythioacetate.

Analysis.—Calc'd. for $C_{13}H_8O_3NSCl$: Cl, 29.21%; N, 3.84%. Found: Cl, 30.45%; N, 3.12%.

The compounds of this invention are adapted to be employed for the control of various pests, particularly of agricultural pests. The compounds, may be mixed with an inert finely divided solid and employed as a dust. Suitable solid carriers are clay, talc, bentonite, as well as other carriers known in the art (see Frear, "Chemistry of Insecticides, Fungicides and Herbicides"). The compounds may also be applied as a spray in a liquid carrier either as a solution in a solvent or as a suspension in a non-solvent such as water. When applied as a suspension it may be desirable to incorporate wetting agents. The compounds of this invention may also be admixed with carriers that are themselves active, such as other parasiticides, herbicides and fertilizers.

In order to establish the biological activity of the compounds of this invention, tests were carried out using representative compounds as agricultural fungicides.

Tests as soil fungicides were carried out by placing discs of agar cultures 5 mm. in diameter of the pathogenic fungi listed in the table below on Petri dish plates of potato dextrose agar containing 10, 100 and 1000 parts, respectively, of the chemical being tested. The plates were then incubated for a sufficient length of time to give satisfactory growth of the fungi on control plates containing no chemical. The growth of the fungi on the test plates was then observed and noted as "0" for no growth, indicating a kill of the fungi; "—" for growth on the original inoculum only, indicating a decided depressing effect of fungus growth but no kill of the fungus, and "+" indicating no inhibition of fungal growth and, therefore, no pronounced depressing effect of the chemical being tested. In the tests recorded below, the growth was recorded after 48 hours' incubation at 20° C.

| Test Organism | Agar Test—Compound of Example III, p.p.m. | | |
|---|---|---|---|
| | 10 | 10² | 10³ |
| Fusarium solani | 0 | 0 | 0 |
| F. oxysporum f. lycopersici | 0 | 0 | 0 |
| Phytophthora cactorum | 0 | 0 | 0 |
| Phytophthora cinnamoni | 0 | 0 | 0 |
| Phytophthora citrophthora | 0 | 0 | 0 |
| Pythium aphanidermatum | 0 | 0 | 0 |
| Pythium ultimum | 0 | 0 | 0 |
| Rhizoctonia solani | — | — | 0 |
| Sclerotinia sclerotiorum | 0 | 0 | 0 |
| Sclerotium rolfsii | 0 | 0 | 0 |
| Verticillium albo-atrum | 0 | 0 | 0 |

Symbols: "+" growth; "—" growth only on inoculum; "0" no growth.

The above results indicate that the compounds of the present invention are active fungicidal agents.

Foilage fungicide tests, as described in "Phytopathology," volume 33, pages 627–632 (1943), and volume 37, pages 354–356 (1947), showed that a concentration of about 2.8 parts per million of the compound of Example III was effective for the inhibition of the germination of 50% of the spore of *Monolinia fructicola*, an organism which causes brown rot in stone fruits. The compound of Example I was also found effective for the inhibition of the germination of 50% of the spore of *Monolinia fructicola* when employed at a concentration of somewhat less than 25 parts per million.

Herbicide tests, as described in "Weeds," volume 1, pages 352–365 (1952), were carried out in order to determine the herbicidal activity of the compounds of the present invention. The compound of Example I showed selective toxicity towards weeds, when applied at a dosage of 16 pounds per acre, the recorded value of percentage activity in pre-emergence tests being 56% against weeds and 0% against crops. The compound of Example II, at a dosage of 8 lbs. per acre, gave a recorded value of percentage activity in pre-emergence tests of 91% against weeds and only 12% against crops. The compound of Example III, at a dosage of 16 lbs. per acre, likewise demonstrated herbicidal activity. The crops tested included corn, wheat, cotton and soybean and the weeds tested included pigweed, crabgrass, mustard and ryegrass.

The foregoing tests therefore indicate the utility of the novel compounds of the present invention as biologically active agents, particularly as displaying useful fungicidal and herbicidal properties.

The invention having been disclosed, what is believed to be new and desired to be secured by Letters Patent is:

1. A compound having the formula:

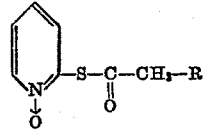

wherein R is a member selected from the group consisting of phenyl, naphthyl, phenoxy, naphthoxy and halogen substituted derivatives thereof.

2. S-(2-pyridyl-1-oxide)-α-naphthalenethioacetate.
3. S-(2-pyridyl-1-oxide)-2′,4′-dichlorophenoxythioacetate.
4. S-(2-pyridyl-1-oxide)-p-chlorophenoxythioacetate.
5. S-(2-pyridyl-1-oxide)-2′,4′,5′-trichlorophenoxythioacetate.
6. A process for the preparation of a compound having the formula:

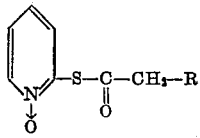

wherein R is a member selected from the group consisting of phenyl, naphthyl, phenoxy, naphthoxy and halogen substituted derivatives thereof which comprises reacting 2-mercaptopyridine-1-oxide with a compound selected from the group consisting of phenyl, naphthyl, phenoxy and naphthoxy acetyl halides, and halogen substituted derivatives thereof, and recovering the reaction product.
7. The process of claim 6 in which the reaction is carried out in the presence of pyridine.

References Cited in the file of this patent
UNITED STATES PATENTS

| | | |
|---|---|---|
| 2,212,895 | Allen | Aug. 27, 1940 |
| 2,445,142 | Himel | July 13, 1948 |
| 2,686,786 | Shaw | Aug. 17, 1954 |